United States Patent Office 3,634,465
Patented Jan. 11, 1972

3,634,465
SALTS AND AMIDES OF TRANS-$\Delta^{22}$-5$\beta$-TAUROCHOLENIC ACID AND METHOD FOR THE PREPARATION THEREOF
Victor J. Grenda, Warren, N.J., assignor to Merck & Co., Inc., Rahway, N.J.
No Drawing. Filed May 16, 1969, Ser. No. 825,413
Int. Cl. C07c 169/64
U.S. Cl. 260—397.1
6 Claims

ABSTRACT OF THE DISCLOSURE

A method for the preparation of the salts and amides of trans-$\Delta^{22}$-5$\beta$-taurocholenic acid which comprises treating the corresponding salt or amide of 5$\beta$-23-halotaurocholanic acid with a reagent capable of eliminating hydrogen halide. The products are hypocholesterolemics and hypolipemics which have utility in the treatment of conditions associated with blood lipid deposition.

---

This invention relates to a novel method for the preparation of salts and amides of trans-$\Delta^{22}$-5$\beta$-taurocholenic acid via the reaction of a 5$\beta$-23-halotaurocholanic acid amide or salt derivative thereof with a reagent capable of eliminating hydrogen halide.

The products of the instant process are pharmacologically active products which effectively reduce the concentration of cholesterol, triglycerides and other lipids in blood serum and, therefore, ameliorate conditions associated with blood lipid deposition.

In accordance with this invention the salts and amides of trans-$\Delta^{22}$-5$\beta$-taurocholenic acid (I, infra) are obtained by treating a 5$\beta$-23-halotaurocholanic acid salt or amide thereof (II, infra) with a reagent capable of eliminating hydrogen halide, for example, inorganic bases including alkali metal or alkaline earth metal bases such as calcium carbonate, sodium carbonate, potassium carbonate, lithium carbonate and the like in the presence of an alkali metal halide such as sodium bromide, potassium iodide, lithium bromide and the like or with an alkali metal alkoxide such as potassium tert-butoxide and the like or an organic base, for example, a tertiary amine such as N,N-dimethylaniline, quinoline and the like, an organic acid, for example, a lower alkanoic acid such as formic acid and the like. The process may be conducted in any solvent in which the reactants are reasonably soluble and which is substantially inert to the reagents employed. Suitable solvents include, for example, N,N-dimethylformamide, N,N-dimethylacetamide, tertiary butanol, N-methylpyrrolidone and the like. The temperature at which the reaction is conducted is not a particularly critical aspect of this invention but, in general, it is most convenient to conduct the reaction at the reflux temperature of the solvent employed. The following equation illustrates this method of preparation:

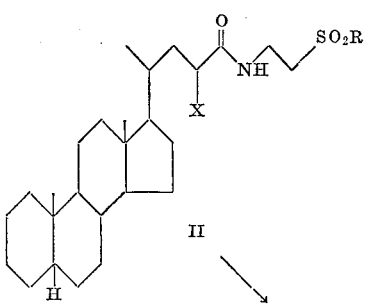

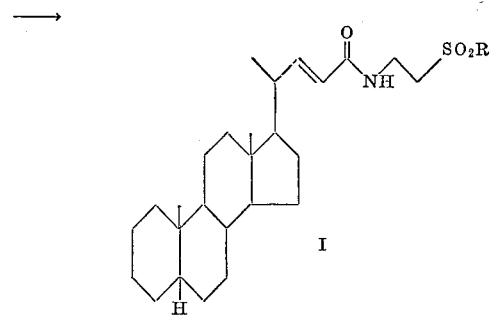

wherein X is halo, such as bromo, chloro and the like; R is —OM wherein M is a cation derived from an alkali metal such as potassium, sodium and the like; an amino radical or a derivative of an amino radical having the formula: —NR$^1$R$^2$, wherein R$^1$ and R$^2$ are the same or different members selected from hydrogen or lower alkyl such as methyl and the like.

A preferred embodiment of this invention relates to the alkali metal salts of trans-$\Delta^{22}$-5$\beta$-taurocholenic acid which are prepared by treating a 5$\beta$-23-halotaurocholanic acid alkali metal salt with a reagent capable of eliminating hydrogen halide. The following equation illustrates this process:

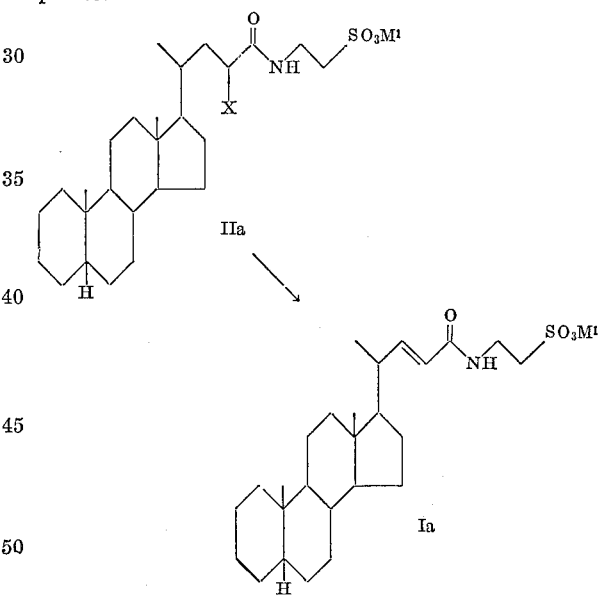

wherein X is halo and M$^1$ is a cation derived from an alkali metal.

The 5$\beta$-23-halotaurocholanic acid salts and amides (II, infra) which are employed as starting materials in the preparation of the salts and amides of trans-$\Delta^{22}$-5$\beta$-taurocholenic acid (I, supra) are obtained by treating a 5$\beta$-23-halocholanoyl halide (III, infra) with an aqueous solution of taurine, a taurine salt or a taurine amide while maintaining the pH of the reaction mixture at from about 7 to about 9. Bases to maintain the reaction mixture at the desired pH include, for example, alkali metal bases such as potassium hydroxide, sodium hydroxide, potassium carbonate, sodium carbonate, potassium bicarbonate, sodium bicarbonate and the like. The temperature at which the reaction is conducted is initially from about —30° C. to about 5° C. which, after several hours, may then be elevated to the boiling point of the particular solvent employed. The solvents employed are preferably water miscible solvents such as tetrahydrofuran, dioxane, dimethylformamide, 1,2-dimethoxyethane and the like although water immiscible solvents such as chlorobenzene, toluene, ethyl acetate and the like may also be employed. The following equation illustrates this method of preparation:

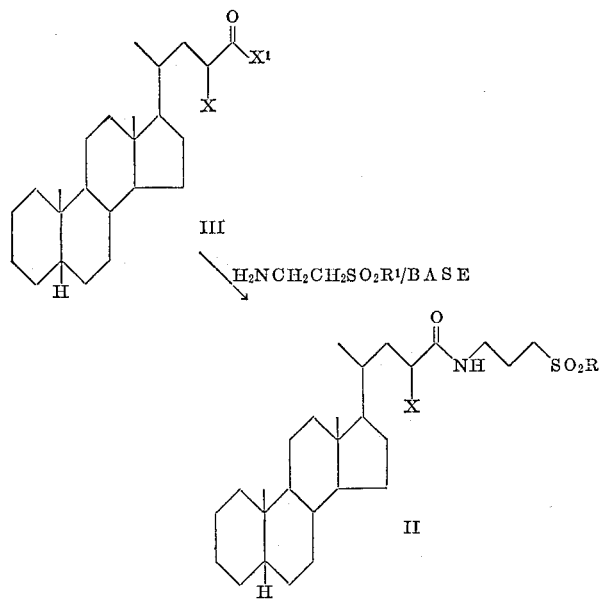

wherein R and X are as defined above, $X^1$ is halo such as chloro and the like and $R^1$ is hydrogen or R wherein R is as defined above.

The 5β-23-halocholanoyl halide (III, infra) which is the precursor employed in the preparation of the salts and amides of 5β-23-halotaurocholanic acid (II, supra) is conveniently prepared by treating 5β-cholanic acid (IV, infra) with a halogenating agent, for example, a thionyl halide such as thionyl chloride and the like to afford a 5β-cholanoyl halide (IVa, infra) which intermediate is then treated with a second reagent capable of substituting halogen for hydrogen at the carbon atom alpha to the carbonyl carbon as, for example, with molecular halogen such as bromine and the like or with a sulfuryl halide such as sulfuryl chloride and the like to yield the desired 5β-23-halocholanoyl halide. The reaction is conveniently conducted in the presence of excess thionyl halide and at the reflux temperature of the particular thionyl halide employed. The following equation illustrates this process:

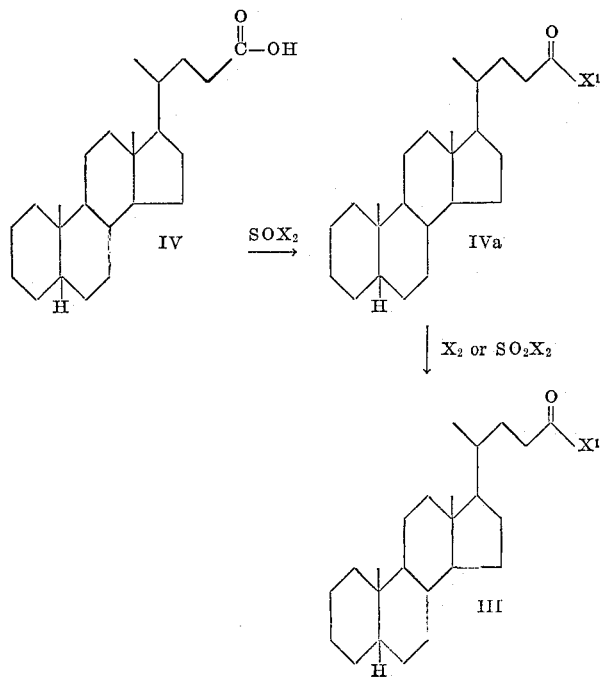

wherein X and $X^1$ are defined above, $X_2$ is molecular halogen such as bromine and the like, $SOX_2$ is thionyl halide such as thionyl chloride and the like and $SO_2X_2$ is sulfuryl halide such as sulfuryl chloride and the like.

There is no clear agreement about the actual role of cholesterol and triglyceride synthesis in the localization of atherosclerotic plaques but numerous studies support the concept that cholesterol and triglyceride play a major role in the pathogenesis of atherosclerosis because along with other lipids and fibrin they accumulate in the arterial intima and subintima to produce arterial corrosion.

Cholesterol and triglycerides are present to some extent in all ordinary diets and, also, they are synthesized by body organs from intermediates of metabolic origin; consequently, the development of a chemotherapeutic agent which will induce a significant reduction in the serum cholesterol and triglyceride level is considered desirable. The $\Delta^{22}$-5β-taurocholenic acid salts of this invention have been tested and found to exhibit good hypocholesterolemic and hypolipemic activity. The ability of the products to inhibit and reduce the concentration of cholesterol and other liquids in serum bespeaks their usefulness as pharmacologically active compounds which have application in the treatment of conditions associated with cardiovascular disease.

The examples which follow illustrate the method for preparing the $\Delta^{22}$-5β-taurocholenic acid salts and amides of this invention. However, the examples are illustrative only and it will be apparent to those having ordinary skill in the art that all of the instant products may be prepared in an analogous manner by substituting the appropriate starting materials for those set forth in the examples.

EXAMPLE 1

Trans-$\Delta^{22}$-5β-taurocholenic acid potassium salt

Step A: 5β-23-bromocholanoyl chloride.—A solution of 5β-cholanic acid (15.5 g., 43 m. moles) in thionyl chloride (60 ml.), at reflux, is treated with bromine (2.8 g.). Reflux is continued for 12 hours after which the excess thionyl chloride and bromine is removed under vacuum to yield 5β-23-bromocholanoyl chloride.

Step B: Potassium 5β-23-bromotaurocholante.—The 5β-23-bromocholanoyl chloride is dissolved in tetrahydrofuran (300 ml.) and the mixture cooled to −20° C. An ice cold solution of taurine (5.66 g., 45.2 m. moles) in water (10 ml.) containing 90 milliequivalents of potassium hydroxide is added slowly (about 45 minutes) in order to keep the pH of the solution about 9. The reaction is aged at −20° C. for 3 hours then heated at 60–65° C. for 2 hours. The reaction mixture is concentrated under vacuum to afford potassium 5β-23-bromotaurocholanate.

Step C: Trans-$\Delta^{22}$-5β-taurocholenic acid potassium salt.—Potassium 5β-23-bromotaurocholanate (29.4 g.) is suspended in dimethylformamide (200 ml.). Calcium carbonate (8 g.) and potassium bromide (8 g.) are added and the resulting mixture is then refluxed for 5 hours. Water (40 ml.) is added to the hot reaction mixture to dissolve the product and the inorganic material is removed by filtration. Trans-$\Delta^{22}$-5β-taurocholenic acid potassium salt crystallizes upon cooling the dimethylformamide water solution to 0–5° C. and the product is then collected on a funnel, washed with two 35 ml. portions of water and dried at 100° C. to yield trans-$\Delta^{22}$-5β-taurocholenic acid potassium salt.

Elemental analysis for $C_{26}H_{42}NSO_4K$.—Calcd. (percent): C, 51.98; H, 8.40; N, 2.78; S, 6.34. Found (percent): C, 62.20; H, 8.43; N, 2.92; S, 6.56.

EXAMPLE 2

Trans-$\Delta^{22}$-5β-taurocholenic acid potassium salt

Step A: 5β-23-chlorocholanoyl chloride.—To a refluxing solution of 5β-cholanic acid (25 g.) in thionyl chloride (100 ml.) there is added sulfuryl chloride (28 ml.) over a one-hour period. Refluxing is continued for 20 hours after which the excess reagents are removed under vacuum to yield 5β-23-chlorocholanoyl chloride.

Step B: Potassium 5β-23-chlorotaurocholanate.—The 5β-23-chlorocholanoyl chloride obtained according to Step A is dissolved in tetrahydrofuran (500 ml.) and cooled to —25° C. The solution is treated with an ice cold mixture of taurine (9 g., 72 m. moles) in water (18 ml.) containing 144 milliequivalents of potassium hydroxide over 65 minutes in order to keep the pH below 9.5. The reaction is aged at —20° C. for 3 hours and then at room temperature for 5 hours, after which the solvents are removed by vacuum distillation. The crude potassium 5β-23-chlorotaurocholanate thus obtained is used directly in the next step.

Step C: Trans-$\Delta^{22}$-5β-taurocholenic acid potassium salt. —The potassium 5β-23-chlorotaurocholanate obtained according to Step B is suspended in tert-butanol (500 ml.) and treated with potassium tert-butoxide (10.0 g.). The reaction mixture is refluxed for 10 hours and then cooled to 0–5° C. and the product collected by filtration. Inorganic material is removed by washing with three 150 ml. portions of water to yield, after drying at 100° C. under vacuum, anhydrous trans-$\Delta^{22}$-5β-taurocholenic acid potassium salt.

EXAMPLE 3

Trans-$\Delta^{22}$-5β-taurocholenic acid sodium salt

Step A: Sodium-5β-23-bromotaurocholanate.—By substituting for the potassium hydroxide recited in Example 1, Step B, an equimolar amount of sodium hydroxide and by following substantially the procedure described therein, there is obtained sodium-5β-23-bromotaurocholanate.

Step B: Trans-$\Delta^{22}$-5β-taurocholenic acid sodium salt.— By substituting for the potassium 5β-23-bromotaurocholanate, calcium carbonate and potassium bromide of Example 1, Step C, an equimolar quantity of sodium-5β-23-bromotaurochlolanate, sodium carbonate and sodium bromide, respectively, and by following substantially the procedure described therein, there is thus obtained trans-$\Delta^{22}$-5β-taurocholenic acid sodium salt.

Elemental analysis for $C_{26}H_{42}NSO_4Na$.—Calcd. (percent): C, 64.03; H, 8.68; N, 4.72. Found (percent): C, 64.28; H, 8.80; N, 4.53.

EXAMPLE 4

Trans-$\Delta^{22}$-5β-cholenic acid taurine amide

Step A: 5β-23-chlorocholanic acid taurine amide.—To a solution of 5β-23-chlorocholanoyl chloride in tetrahyrofuran (500 ml.) at —25° C is added an ice cold mixture of taurine amide (72 m. moles) in water (18 ml.) containing 72 milliequivalents of potassium hydroxide at such a rate as to maintain the pH of the reaction mixture below 9.5. The reaction mixture is maintained at —20° C. for 3 hours and then at room temperature for 5 hours. Removal of the solvent, under vacuum, yields 5β-23-chlorocholanic acid taurine amide.

Step B: Trans-$\Delta^{22}$-5β-cholenic acid taurine amide.—A suspension of 5β-23-chlorocholanic acid taurine amide in dimethylformamide (200 ml.) is treated with calcium carbonate (8 g.) and potassium bromide (8 g.). The mixture is refluxed for 5 hours. The solvent is removed under vacuum and the residue dissolved in chloroform. The solution is washed with water, dried over magnesium sulfate, filtered and evaporated under vacuum to yield crude trans-$\Delta^{22}$-5β-cholenic acid taurine amide. The product is then dissolved in tetrahydrofuran, filtered and petroleum ether is added to precipitate pure trans-$\Delta^{22}$-5β-cholenic acid taurine amide.

Elemental analysis for $C_{26}H_{44}N_2SO_3$.—Calcd. (percent): C, 66.96; H, 9.68; N, 5.94. Found (percent): C, 67.20; H, 9.55; N, 6.03.

By substituting for the taurine amide of Step A, Example 4, an equimolar quantity of taurine dimethyl amide and by following substantially the procedure described therein, there is obtained 5β-23-chlorocholanic acid taurine dimethyl amide which, when substituted for the 5β-23-chlorocholanic acid taurine amide of Step B, Example 4, and following substantially the procedure described therein, affords trans-$\Delta^{22}$-5β-cholenic acid taurine dimethyl amide.

EXAMPLE 5

Trans-$\Delta^{22}$-5β-taurocholenic acid potassium salt

Step A: Potassium 5β-23-bromotaurocholanate.—To a solution of 5β-23-bromocholanoyl chloride (43 m. moles) in tetrahydrofuran (300 ml.) at —20° C. is slowly added a solution of taurine potassium salt (45 m. moles) in water (10 ml.). The pH of the solution is maintained between 7 and 9 by the addition of a solution of potassium hydroxide (45 m. moles) in water (10 ml.). The reaction mixture is aged at —20° C. for 3 hours and then refluxed for 2 hours. The solvent is removed under vacuum to yield potassium 5β-23-bromotaurocholanate.

Step B: Trans-$\Delta^{22}$-5β-taurocholenic acid potassium salt. —By substituting potassium 5β-23-bromotaurocholanate for the potassium 5β-23-bromotaurocholanate, calcium carbonate and potassium bromide recited in Example 1, Step C, and following the procedure described therein, there is thus obtained trans-$\Delta^{22}$-5β-taurocholenic acid potassium salt.

The above examples are merely illustrative of the instant method and it is to be understood that this invention is not to be limited by the specific examples but rather embraces all variations and modifications thereof which fall within the scope of the foregoing discussion and the appended claims.

I claim:
1. A compound having the formula:

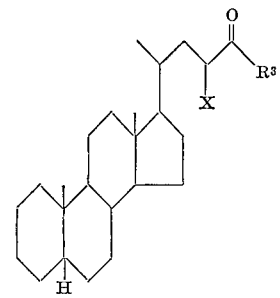

wherein $R^3$ is halo, —$NHCH_2CH_2SO_2OM$ wherein M is a cation derived from an alkali metal or

wherein $R^1$ and $R^2$ are the same or different members selected from hydrogen or lower alkyl and X is halo.

2. A compound according to claim 1 having the formula:

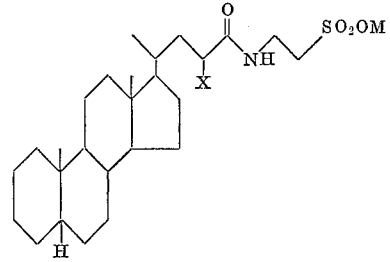

wherein M is the cation derived from an alkali metal and X is halo.

3. A compound according to claim 2 wherein the alkali metal cation is selected from potassium or sodium.

4. A process for preparing a compound having the formula:

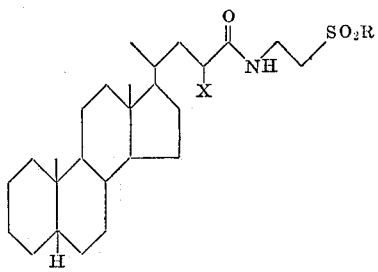

wherein X is halo and R is —OM wherein M is a cation derived from an alkali metal or —NR¹R² wherein R¹ and R² are the same or different members selected from hydrogen or lower alkyl; which comprises treating a compound having the formula:

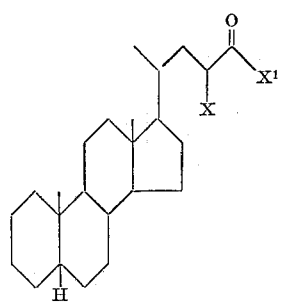

wherein X is as defined above and X¹ is halo, with a reagent having the formula: H₂NCH₂CH₂SO₂R, wherein R is as defined above, in the presence of a base.

5. A process according to claim 4 for preparing a compound having the formula:

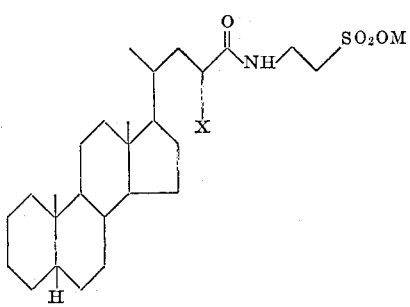

wherein X is halo and M is potassium or sodium; which comprises treating a compouund of the formula:

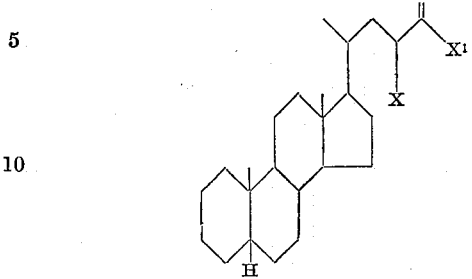

wherein X¹ is halo with a compound having the formula: H₂NCH₂CH₂SO₂M, wherein M is as defined above, in the presence of a base.

6. A process for preparing a compound having the formula:

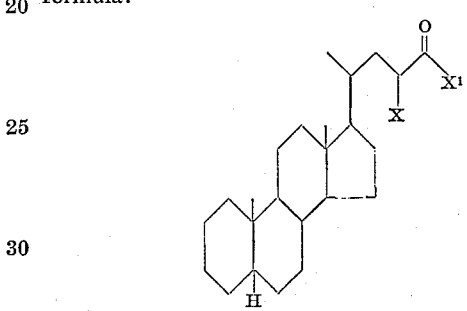

wherein X and X¹ are halo; which comprises treating 5β-cholanic acid with a reagent capable of forming an acyl halide to afford a compound having the formula:

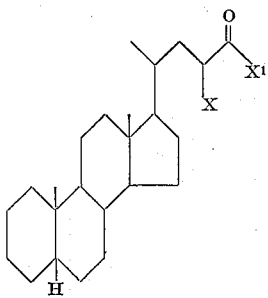

wherein X¹ is as defined above, followed by the treatment of said compound with a halogenating agent.

References Cited

UNITED STATES PATENTS 3,463,795   8/1969   Sarel et al. _____ 260—397.1

ELBERT L. ROBERTS, Primary Examiner